United States Patent
Johnson

(10) Patent No.: US 10,358,345 B2
(45) Date of Patent: *Jul. 23, 2019

(54) METAL EUTECTIC SUPPORTED METAL CATALYST SYSTEM AND REACTIONS WITH THE METAL CATALYST SYSTEM

(71) Applicant: Allen L. Johnson, Las Vegas, NV (US)

(72) Inventor: Allen L. Johnson, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/941,903

(22) Filed: Nov. 16, 2015

(65) Prior Publication Data

US 2016/0137497 A1 May 19, 2016

Related U.S. Application Data

(63) Continuation of application No. 13/917,790, filed on Jun. 14, 2013, now Pat. No. 9,186,655.

(60) Provisional application No. 61/660,555, filed on Jun. 15, 2012.

(51) Int. Cl.
| | |
|---|---|
| *C01B 3/32* | (2006.01) |
| *C01B 3/22* | (2006.01) |
| *B01J 31/02* | (2006.01) |
| *B01J 35/00* | (2006.01) |
| *B01J 37/03* | (2006.01) |
| *B01J 23/52* | (2006.01) |
| *B01J 23/745* | (2006.01) |
| *B01J 23/75* | (2006.01) |
| *B01J 23/755* | (2006.01) |
| *B01J 35/12* | (2006.01) |
| *C01B 32/05* | (2017.01) |

(52) U.S. Cl.
CPC ........... *C01B 3/326* (2013.01); *B01J 23/52* (2013.01); *B01J 23/745* (2013.01); *B01J 23/75* (2013.01); *B01J 23/755* (2013.01); *B01J 31/0202* (2013.01); *B01J 35/0006* (2013.01); *B01J 35/006* (2013.01); *B01J 35/0013* (2013.01); *B01J 35/12* (2013.01); *B01J 37/035* (2013.01); *C01B 3/22* (2013.01); *C01B 32/05* (2017.08); *C01B 2203/0277* (2013.01); *C01B 2203/1041* (2013.01); *C01B 2203/1047* (2013.01); *C01B 2203/1052* (2013.01); *C01B 2203/1058* (2013.01); *C01B 2203/1217* (2013.01); *C01B 2203/1229* (2013.01)

(58) Field of Classification Search
CPC ...................................................... C01B 3/326
See application file for complete search history.

(56) References Cited

U.S. PATENT DOCUMENTS

| | | | |
|---|---|---|---|
| 2,393,569 A | 1/1946 | Ross et al. | |
| 3,979,332 A | 9/1976 | Kiovsky et al. | |
| 4,216,194 A | 8/1980 | Regier | |
| 5,632,962 A | 5/1997 | Baker et al. | |
| 5,635,439 A * | 6/1997 | Fukui | B22F 9/008 502/326 |
| 6,218,326 B1 * | 4/2001 | Datta | B01J 23/42 502/250 |
| 2009/0012345 A1 | 1/2009 | Al Nashef et al. | |
| 2009/0326262 A1 | 12/2009 | Wan | |
| 2010/0210454 A1 | 8/2010 | Epshteyn et al. | |
| 2011/0015446 A1 | 1/2011 | Maurer et al. | |

OTHER PUBLICATIONS

A Thermodynamic Study of the Lead-Bismuth System H.S. Strickler and Harry Seltz Journal of the American chemical soceity vol. 58, pp. 2084-2093, Nov. 1936.*
Mahmoud, Eugene Leo Draine (2010) Low temperature catalytic ethanol conversion over ceria-supported platinim, rhodium, and tin-based nanoparticle systems.

* cited by examiner

*Primary Examiner* — Douglas B Call
(74) *Attorney, Agent, or Firm* — Fish & Richardson P.C.

(57) ABSTRACT

A eutectic supported catalyst system is used in catalyzed chemical reactions. A metal catalyst particle is supported in a eutectic medium. The system may have a) a eutectic composition of at least two metals forming the eutectic composition; and b) metal catalyst particles, preferably of nanometer dimensions, such as from 0.5 to 50 nm. The particles are dispersed throughout the eutectic composition when the eutectic composition is solid, and the particles are dispersed or suspended throughout the eutectic composition when the eutectic composition is in liquid form. At least one metal of the eutectic may comprises lead and a metal in the metal catalyst is a different metal then the metals in the eutectic. The eutectic may be in a liquid state and the metal catalyst particles may be in an equilibrium state within the eutectic.

16 Claims, 3 Drawing Sheets

FIGURE 1: shows a classic graph of a eutectic system.
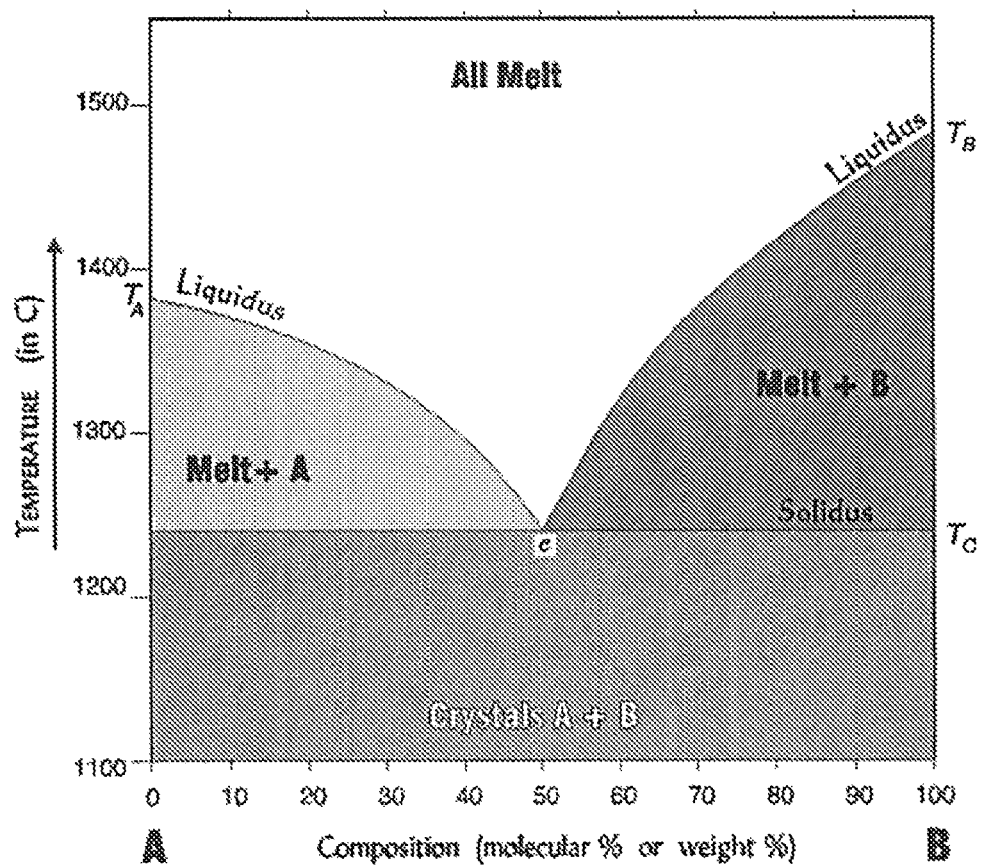

FIGURE 2: shows cooling diagrams for types of eutectic systems.
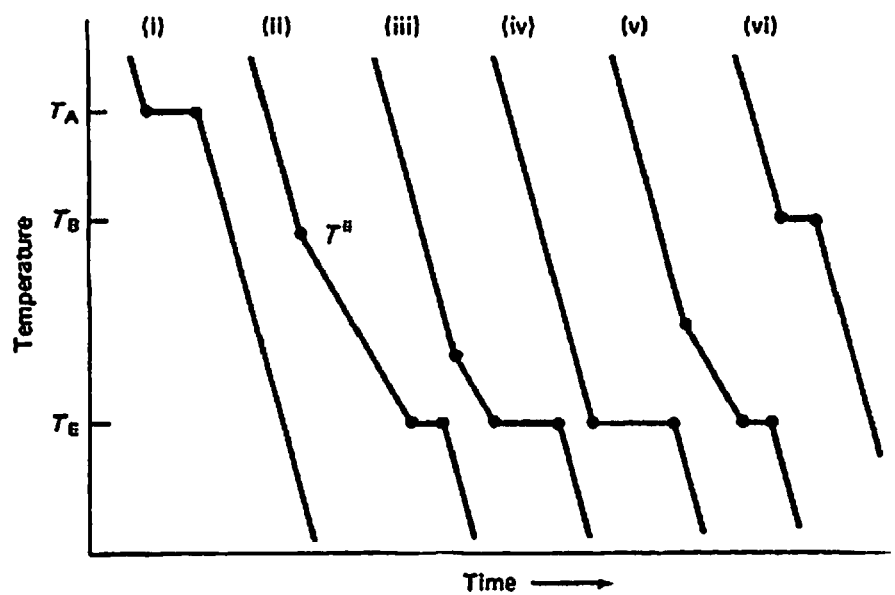
Sample cooling curves

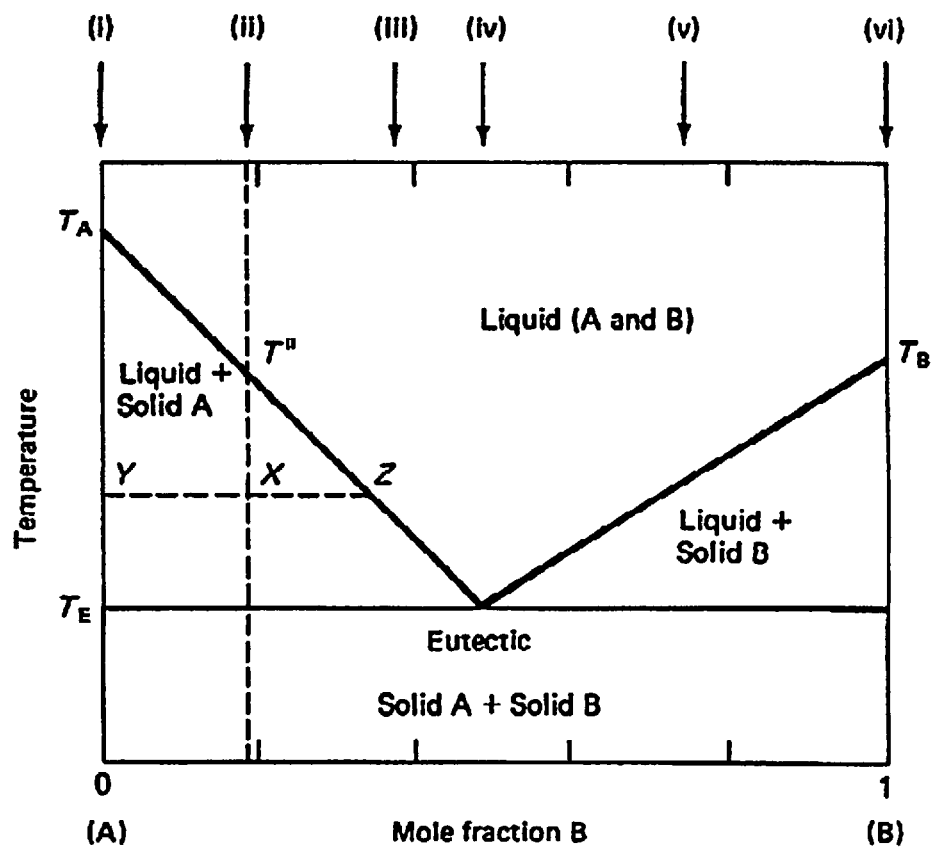
FIGURE 3: Phase Diagram Associated with Cooling Curves of Figure 2.

METAL EUTECTIC SUPPORTED METAL CATALYST SYSTEM AND REACTIONS WITH THE METAL CATALYST SYSTEM

RELATED APPLICATION DATA

This application is a continuation of U.S. patent application Ser. No. 13/917,790 filed Jun. 14, 2013 (now U.S. Pat. No. 9,186,655), which claims the benefit of U.S. Provisional Application Ser. No. 61/660,555 filed Jun. 15, 2012.

BACKGROUND OF THE INVENTION

1. Field of the Invention

The present invention relates to the field of catalysis, catalysts, metal catalysts and reactions performed with metal catalysts. The field of the invention also includes to the field of novel catalyst support systems and the use of metal eutectics in a liquid state to support metal catalysts and support chemical reactions therein.

2. Background of the Art

Catalysis is the change in rate of a chemical reaction due to the participation of a substance called a catalyst. Unlike other reagents that participate in the chemical reaction, a catalyst is not consumed by the reaction itself. A catalyst may participate in multiple chemical transformations. Catalysts that speed the reaction are called positive catalysts. Substances that slow a catalyst's effect in a chemical reaction are called inhibitors. Substances that increase the activity of catalysts are called promoters, and substances that deactivate catalysts are called catalytic poisons.

Catalytic reactions have a lower rate-limiting free energy of activation than the corresponding uncatalyzed reaction, resulting in higher reaction rate at the same temperature. However, the mechanistic explanation of catalysis is complex. Catalysts may affect the reaction environment favorably, or bind to the reagents to polarize bonds.

Kinetically, catalytic reactions are typical chemical reactions; i.e., the reaction rate depends on the frequency of contact of the reactants in the rate-determining step. Usually, the catalyst participates in this slowest step, and rates are limited by amount of catalyst and its "activity." In heterogeneous catalysis, the diffusion of reagents to the surface and diffusion of products from the surface can be rate determining. Analogous events associated with substrate binding and product dissociation apply to homogeneous catalysts.

Although catalysts tend to not be consumed by the reaction itself, they may be inhibited, deactivated, or destroyed by secondary processes. In heterogeneous catalysis, typical secondary processes include coking where the catalyst becomes covered by polymeric side products, products or by-products of the reaction. Additionally, heterogeneous catalysts can dissolve into the solution in a solid-liquid system or evaporate in a solid-gas system.

The chemical nature of catalysts is as diverse as catalysis itself, although some generalizations can be made. Proton acids are probably the most widely used catalysts, especially for the many reactions involving water, including hydrolysis and its reverse. Multifunctional solids often are catalytically active, e.g., zeolites, alumina, higher-order oxides, graphitic carbon, nanoparticles, nanodots, and facets of bulk materials. Transition metals are often used to catalyze redox reactions (oxidation, hydrogenation). Examples are nickel, such as Raney nickel for hydrogenation, and vanadium(V) oxide for oxidation of sulfur dioxide into sulfur trioxide. Many catalytic processes, especially those used in organic synthesis, require so called "late transition metals", which include palladium, platinum, gold, ruthenium, rhodium, and iridium.

Heterogeneous catalysts are typically "supported," which means that the catalyst is dispersed on a second material that enhances the effectiveness or minimizes their cost. Sometimes the support is merely a surface on which the catalyst is spread to increase the surface area. More often, the support and the catalyst interact, affecting the catalytic reaction. Supports are often porous materials with a high surface area, most commonly alumina or various kinds of activated carbon. Specialized supports include silicon dioxide, titanium dioxide, calcium carbonate, and barium sulfate.

Homogeneous catalysts function in the same phase as the reactants, but the mechanistic principles invoked in heterogeneous catalysis are generally applicable. Typically homogeneous catalysts are dissolved in a solvent with the substrates. One example of homogeneous catalysis involves the influence of $H^+$ on the esterification of esters, e.g., methyl acetate from acetic acid and methanol. For inorganic chemists, homogeneous catalysis is often synonymous with organometallic catalysts Hydrogen is the most abundant element in the universe, but it can be difficult and costly to obtain as a pure gas. The present technologies used for providing hydrogen gas include electrolysis of water to produce hydrogen and oxygen and splitting hydrogen gas from water or alcohols. The ability to pull apart $H_2O$ and particularly $CH_2OH$ or $CH_3CH_2OH$ molecules into their constituent atoms is important to creating a hydrogen-based energy economy. To do so in a cheap and energy efficient manner could potentially turn Earth's vast supply of water into a carrier or supply of cheap, clean power.

But most hydrogen gas on earth comes packaged as water, which can be split into oxygen and hydrogen through a process called electrolysis. Electrolysis requires a good deal of electricity, but if renewable fuels generate that power, the process can be carbon neutral. Electrolysis usually requires a catalyst to efficiently split water into oxygen and hydrogen gas, the most common of which is platinum, which is expensive.

Metal catalysts such as Fe, Ni, Co, Me, Pt and complexes thereof are useful in the hydrogen gas forming processes. By metal catalysts, it is not meant that only a single metal, or a metal(s) in a zero valence metal state is used. Compounds, complexes and combinations of metals and different mixtures of crystalline forms or states of metal can be used. For example, the Berkeley Lab team devised a high-valence metal molybdenum-oxo ($PY_5Me_2$) for a catalyst for electrolysis.

Many other forms of catalysts are available for use in the many various chemical reactions, including those useful in generating hydrogen.

Low temperature catalytic ethanol conversion over ceria-supported platinum, rhodium, and tin-based nanoparticle systems are described in Mahmoud, Eugene Leo Draine (2010) *Low temperature catalytic ethanol conversion over ceria-supported platinum, rhodium, and tin-based nanoparticle systems*. Engineer's thesis, California Institute of Technology. http://resolver.caltech.edu/CaltechTHESIS:06102010-171305208. It is there discussed that due to the feasibility of ethanol production in the United States, ethanol has become more attractive as a fuel source and a possible energy carrier within the hydrogen economy. Ethanol can be stored easily in liquid form, and can be internally pre-formed prior to usage in low temperature (200° C.-400° C.) solid acid and polymer electrolyte membrane fuel cells.

However, complete electrochemical oxidation of ethanol remains a challenge. Prior research of ethanol reforming at high temperatures (>400° C.) has identified several metallic and oxide-based catalyst systems that improve ethanol conversion, hydrogen production, and catalyst stability. In this study, ceria-supported platinum, rhodium, and tin-based nanoparticle catalyst systems were developed and analyzed in their performance as low-temperature ethanol reforming catalysts for fuel cell applications. Metallic nanoparticle alloys were synthesized with ceria supports to produce the catalyst systems studied. Gas phase byproducts of catalytic ethanol reforming were analyzed for temperature-dependent trends and chemical reaction kinetic parameters. Results of catalytic data indicate that catalyst composition plays a significant role in low-temperature ethanol conversion. Analysis of byproduct yields demonstrate how ethanol steam reforming over bimetallic catalyst systems (platinum-tin and rhodium-tin) results in higher hydrogen selectivity than was yielded over single-metal catalysts. Additionally, oxidative steam reforming results reveal a correlation between catalyst composition, byproduct yield, and ethanol conversion. By analyzing the role of temperature and reactant composition on byproduct yields from ethanol reforming, this study also proposes how these parameters may contribute to optimal catalytic ethanol reforming.

Published US Patent Application Document No. 20090012345 (Al Nashef) provides a potentially economically viable process for the destruction of small to large quantities of halogenated hydrocarbons, their homologous/analogues, and similar hazardous chemicals at ambient conditions using superoxide ion in deep eutectic solvents. The superoxide ion is either electrochemically generated by the reduction of oxygen in deep eutectic solvents or chemically by dissolving Group 1 (alkali metals) or Group 2 (alkaline earth metals) superoxides, e.g. potassium superoxide, in deep eutectic solvents.

Published US Patent Application Document No. 20110015446 (Maurer) describes the use of a supported noble metal catalyst obtainable by applying a sparingly soluble noble metal compound to a support from solution or suspension, and subsequently treating thermally, for preparing olefinically unsaturated carbonyl compounds.

Published US Patent Application Document No. 20100210454 (Epshteyn) is generally directed to a nanocomposite catalyst material for electrochemical devices such as fuel cells, comprising metal nanoparticles impregnated on a conductive support that is coated with a transition metal compound. The metal nanoparticles may comprise platinum; the metal phosphate may comprise tantalum oxyphosphate, niobium oxyphosphate, tantalum oxide, niobium oxide, or any combination thereof; and the conductive support may comprise carbon. In addition, the invention provides for a method of making the catalyst material.

Published US Patent Application Document No. 20090326262 (Wan) relates to improvements in metal utilization in supported, metal-containing catalysts. For example, the invention relates to methods for directing and/or controlling metal deposition onto surfaces of porous substrates. The present invention also relates to methods for preparing catalysts in which a first metal is deposited onto a support (e.g., a porous carbon support) to provide one or more regions of a first metal at the surface of the support, and a second metal is deposited at the surface of the one or more regions of the first metal. Generally, the electropositivity of the first metal (e.g., copper or iron) is greater than the electropositivity of the second metal (e.g., a noble metal such as platinum) and the second metal is deposited at the surface of the one or more regions of the first metal by displacement of the first metal. The disclosure further relates to treated substrates, catalyst precursor structures and catalysts prepared by these methods. The invention further relates to use of catalysts prepared as detailed herein in catalytic oxidation reactions, such as oxidation of a substrate selected from the group consisting of N-(phosphonomethyl) iminodiacetic acid or a salt thereof, formaldehyde, and/or formic acid.

A eutectic point, which occurs in a eutectic mixture or eutectic combination of materials is a mixture of substances, especially an alloy, having the lowest freezing point of all possible mixtures of the substances. To be a eutectic mixture, the combination does not have to be at the eutectic point (the lowest temperature at which the eutectic mixture freezes and thaws), as it is the ratio of materials that defines the eutectic. The perfect eutectic mixture is the one mixture of a set of substances able to dissolve in one another as liquids that, of all such mixtures, liquefies at the lowest temperature. If an arbitrarily chosen liquid mixture of such substances is cooled, a temperature will be reached at which one component will begin to separate in its solid form and will continue to do so as the temperature is further decreased. As this component separates, the remaining liquid continuously becomes richer in the other component, until, eventually, the composition of the liquid reaches a value at which both substances begin to separate simultaneously as an intimate mixture of solids. This composition is the eutectic composition and the temperature at which it solidifies is the eutectic temperature; if the original liquid had the eutectic composition, no solid would separate until the eutectic temperature was reached; then both solids would separate in the same ratio as that in the liquid, while the composition of the remaining liquid, that of the deposited solid, and the temperature all remained unchanged throughout the solidification.

A eutectic system is a mixture of chemical compounds or elements that has a single chemical composition that solidifies at a lower temperature than any other composition made up of the same ingredients. This composition is known as the eutectic composition and the temperature is known as the eutectic temperature. On a phase diagram the intersection of the eutectic temperature and the eutectic composition gives the eutectic point. Not all binary alloys have a eutectic point; for example, in the silver-gold system the melt temperature (liquidus) and freeze temperature (solidus) both increase monotonically as the mix changes from pure silver to pure gold.

SUMMARY OF THE INVENTION

The present technology includes supported catalyst systems and their method of use in catalyzed chemical reactions. These systems can be used in catalyzing chemical reactions. The catalyst system is comprised of metal particles (which are themselves catalysts for chemical reactions) supported in a low melting point medium. The system may have a) a eutectic composition comprising two or more metals forming the eutectic composition; and b) metal catalyst particles, preferably of nanometer dimensions, such as from 0.5 to 50 nm, more preferably having average diameters of from 1-25 nm. The particles are dispersed throughout the eutectic composition when the eutectic composition is solid, and the particles are dispersed or suspended throughout the eutectic composition when the eutectic composition is in liquid form. A metal or metal alloy in the metal catalyst is a different metal than the metals in the eutectic.

The eutectic may be in a liquid state and the metal catalyst particles may be in an equilibrium state within the eutectic. When the eutectic is in a liquid state, it may be at a temperature below the melting point of the component metals. The metal catalyst particles are originally formed by precipitation from solution in the low melting point alloy—and during operation the catalyst particles can be continuously dissolving and reforming, depending on temperature. During some of the chemical reactions catalyzed in the technology described herein, gaseous alcohol bubbles (as a reactant) and hydrogen gas bubbles (as a product) are present within the liquid eutectic.

BRIEF DESCRIPTION OF THE FIGURES

FIG. 1 shows a classic graph of a eutectic system.
FIG. 2 shows cooling diagrams for types of eutectic systems.
FIG. 3 shows a representative graph of a eutectic system identifying points used in the cooling graph of FIG. 2.

DETAILED DESCRIPTION OF THE INVENTION

The present technology may be generally described, without limiting the scope of technology, as methods of providing, establishing, supporting and/or using catalyst systems. Catalytic particles are supported in a solution medium, the solution medium being in the chemical proximity of a eutectic composition of the multiple solvent components formed by the multiple solvent components. A concept believed embodied within the present technology is that the catalyst particles remain suspended and moveable within the eutectic solution. During use of the eutectic supported catalyst particles, the active reaction environment (e.g., the liquid or gases flowing across the surface of the heated eutectic-supported catalyst particles/reactant gases being bubbled through the liquid) allows or even assists in the movement of the catalyst particles within the eutectic so that catalyst particles exposed on the surface of the eutectic solution are replaced by movement of the particles. This movement of the catalyst particles allow two novel catalytic phenomena—catalyst bound products can move to new reactive sites for either further reaction or product delivery (e.g. a collection surface or aspiration into a gas). It is also believed or hypothesized that residue is removed from catalytic particles (residue from catalyzed reactions, especially deposited organics, including atomic C) by the movement of the catalyst particles through the eutectic medium and by solution and reformation of the particles in situ. In this way, catalytic activity on the surface of the eutectic solution provided by catalytic particles is maintained at a desired level. This self-cleaning behavior of the eutectic supported catalyst is believed to occur at reaction conditions. Such reaction conditions may, by way of a non-limiting set of ranges as example, be at temperatures above about 100° C., above 120° C., above 123° C., between 123° C. and 300° C. and even at higher temperatures, such as between 123° C. and 400° C.

The eutectic must be fluid and preferably liquid at the reaction temperatures again by way of non-limiting example at temperatures of 100° C. and above, preferably within the range of between 120° C. and 400° C., more preferably between 120° C. and 350° C., still more preferably between 123° C. and 300° C., which may be similar to or identical to the reaction temperatures. Many reactants are thermally sensitive, and thus low operation temperature increases product yield and selectivity. The components of the eutectic may be selected from among elemental materials and molecules, often the elemental materials and molecules being metallic elements and metallic compounds. Preferably the metals (which as exemplified, includes semimetals) may be selected from among e.g., lead, bismuth, tin, silver, gallium, gold, mercury and aluminum. Nitrides, nitrates, carbonates, sulfides and oxides of these metals may also be used in the eutectics, as well as alloys of these metals. The metals and components of the low melting support are chosen to have low reactivity with the reactants and the catalytic metals.

By way of general, non-limiting examples of the types of materials contemplated within the scope of the present technology, the following should be considered.

1) Non-limiting list of metal catalysts to be considered as specifically useful in the present technology.

All catalytic metals should have applicability to this technology. The solubility needs only to be non-zero (above zero) in the support (the liquid eutectic within at least some portion of the reaction temperature range) to allow precipitation of the catalyst as small particles. In particular, transition metal catalysts, noble metal catalysts, and modified metal catalysts (also see the below description on the possibility of modification of catalyst particles by co-adsorbing metals on the precipitate surface) are all possible catalytic system for this technology.

2) Non-limiting list of eutectic metal compositions useful in the scope of the present technology.

Most eutectic mixtures have applicability, limited by the necessity to avoid strong interactions between the eutectic (low melting point support) and the catalyst or the reactants. In general, for early transition metal catalysts, it is suggested that early transition metal eutectics, and late transition metal catalyst should use late eutectics—this is to avoid the kind of "d acid-base" interactions suggested in the art. The following is also a list of current low melting point alloys that are contemplated within the scope of the present technology, and several do not include lead. Gallium would provide the basis for an interesting system—it is innately low melting, and might with the appropriate alloying elements make a low activity support for many catalytic metals, and similar things could be said of indium. Lead is definitely a possible component in the general case—but if lead makes too stable an alloy with the catalyst (lead silver for example may be too stable for our purposes) then other systems can be brought into play. The low melting alkali metal alloys are also interesting. There are systems contemplated where they may be useful, using diamond powder or nanoscale (e.g., up to 100 nanometers, preferably up to 10 or up to 25 nanometers) diamond-like carbon in some of catalytic environments.

3) Non-limiting list of preferred combinations of specific eutectics and specific catalysts.

We have shown functionality of PbBi with Fe, Ni, and Co. This eutectic is clearly reasonable based on scientific analysis with most of the noble metal catalysts as well—the noble catalysts having decent (measurable) solubility in lead based alloys, especially at the potentially elevated temperatures of the reaction conditions. However, some also have strong alloying reactions with Pb, and so might form inter-metallics with modified activity.

4) Non-limiting examples providing identification of specific reactions that may be catalyzed by the metal catalysts. This is done in generic format (without appropriate scientific notation) such as:

alkylOH plus heat plus catalyst=$H_2$, C etc.
$H_2O$ plus e− plus catalyst=$2H_2+O_2$, etc.

Any fluid reaction medium may be used that is catalyzed by the metal catalyst and can be passed over the catalyst-eutectic at reaction temperatures that does not contain levels of materials that are reactive with the metals of the catalyst or eutectic at such a rate as to quickly (less than 15 minutes) reduce the rate of reactivity of the reaction by more than 50% can be used with the present technology. Such materials might be the reactants themselves, by-products, products, solvents or other additives to the reaction (viscosity agents, UV absorbers, etc.).

Any catalytic particle that does not decompose at the use temperature, and preferably metallic catalytic particles may be used. For example, low temperature decomposing organic materials would not be useful catalysts. Iron, nickel, cobalt, silver (especially in non-silver eutectics), gold (especially in non-gold eutectics), alloys thereof and the like are likely candidates for the catalytic metal. Metal catalysts are generally described as particularly including transition metals and complexes of transition metals. In the practice of the present technology, all metal catalysts described herein are potential candidates for use in the present technology.

The present technology includes supported catalyst systems and their method of use in catalyzed chemical reactions. These systems can be used in catalyzing chemical reactions. The catalyst comprises a metal particle supported in a eutectic medium. The system may have a) a eutectic composition comprising two metals forming the eutectic composition; and b) metal catalyst particles, preferably of nanometer dimensions, such as from 0.5 to 50 nm, more preferably having average diameters of from 1-25 nm. The particles are dispersed throughout the eutectic composition when the eutectic composition is solid, and the particles are dispersed or suspended throughout the eutectic composition when the eutectic composition is in liquid form. At least one metal of the eutectic may, by way of a non-limiting example, comprise lead and a metal in the metal catalyst is a different metal then the two metals in the eutectic. The eutectic may be in a liquid state and the metal catalyst particles may be in an equilibrium state within the eutectic. When the eutectic in a liquid state, it may be at a temperature of between 20° C. and 300° C. or between 25° C. or 30° C. and 250° C. When the eutectic in a liquid state is at a temperature of between 30° C. and 250° C., the equilibrium state of the catalyst particles may have metal of the metal catalyst dissolving off the catalyst particles and precipitating onto the catalyst particles. During some of the chemical reactions catalyzed in the technology described herein, gaseous alcohol bubbles (as a reactant) and hydrogen gas bubbles (as a product) are present within the liquid eutectic.

A method according to the present invention includes catalytically chemically modifying organic compounds in a catalytic reaction. The catalytic reaction uses a metal catalyst of a metal different from the metals of a supporting eutectic or low melting point alloy. In the practice of the present technology, where the word "eutectic" (alone) is used, that term is defined as inclusive of low melting point alloys. Where the term "eutectic material" is used, that includes only recognized eutectics (including small compositional variations surrounding an actual eutectic point, e.g., ±25% of the relative concentration of an individual component of the eutectic. Steps of the method may include supporting metal catalyst particles having average diameters of from 1-25 nm within a liquid eutectic comprising two metals;

flowing a gaseous organic compound as bubbles through the liquid eutectic;

the gas bubbles contacting metal catalyst particles exposed from the liquid eutectic against an interface between the bubbles and the eutectic;

the organic compound altering its chemical composition by catalyzed reaction on contact with the metal catalyst particles; and the catalyst particles are mobile in the liquid eutectic and thus bound product can move to new reactive sites and products removed from the particles in new and novel ways.

The supported catalyst system of the present technology may also have the eutectic in a liquid state at a temperature of between the melting point of the low melting alloy and higher temperatures and 750° C., and the equilibrium state of the catalyst particles has metal of the metal catalyst dissolving or washing off residues or precipitates on surfaces of the catalyst particles. A reaction product of the catalyzed reaction of the organic compound may be hydrogen and/or carbon. The liquid eutectic may be maintained within a temperature range of 30° C. and 650° C. and the organic compound may consists of carbon, hydrogen and oxygen. The method may have the liquid eutectic maintained within a temperature range of the melting point of the alloy to the reaction temperature, with possible excursions to higher temperature to dissolve the catalytic metal prior to its precipitation as particles, organic compound flows as bubbles through the liquid eutectic, and the bubbles contact metal catalyst particles exposed from the liquid eutectic against an interface between the bubbles and the liquid eutectic. The alteration of the organic compound may generate hydrogen. The organic compound may comprise an alcohol. The eutectic may be maintained in a liquid state at a temperature, for example, of between 30° C. and 250° C. In this condition or state an equilibrium state of the catalyst particles may be maintained wherein metal of the metal catalyst dissolves off the metal catalyst particles and precipitates onto the catalyst particles. The dissolving and precipitation can maintain a clean surface of metal of the metal catalyst on surfaces of the metal catalyst particles.

This latter event would be a significant improvement on typical supported metal catalyst systems, on which residue from the chemical reaction or alteration often forms on the metal catalyst. This residue can foul the surface of the catalyst, reduce the efficiency of the system, and require shutdown of the system for cleaning or complete replacement of the metal catalyst. In a process of the present technology, the clean surface of catalytic metal particles may be maintained in a relatively pure state by dissolution and precipitation of elemental metal on the catalytic metal particle surface. The method may include alteration of the gaseous organic compound to generate hydrogen, especially where the organic compound comprises an alcohol.

In the practice of the present technology, the eutectic mixture does not have to be at the exact and perfect eutectic combination, as the metals will still dissolve within each other (even if at higher temperatures that the perfect eutectic point). Therefore, the eutectic mixture may vary ±10% or vary ±15% by absolute weight of the two metals at points in the eutectic graph, with respect to the relative proportion of the highest or lowest concentration component at the perfect eutectic point. This can be easily understood by reference to FIG. 1 which is a classic graphic representation of a eutectic system between hypothetic ingredients A and B.

The salient quality of the low melting/eutectic mixture is that the chemical activity of the component(s) in the mixture are much lower than the activity of the components in the solid state—thus the low melting behavior. This same low chemical activity is what allows the catalyst particle to become "uncovered" during exposure to the reactants, and thus intimate chemical interaction between the reactant and the catalyst particle is possible. In a pure metal liquid, the surface of the catalyst particle become covered by a monolayer of the liquid metal, and thus the catalyst surface is unavailable. For example, equivalent reactions in pure liquid lead show no catalytic activity where reactions in lead bismuth eutectic show strong catalytic activity.

The eutectic point e is shown idealized at a 50/50 weight percent or molecular percent. For purposes of this description, a 50/50 weight percent will be discussed. As shown in the diagram, the melting point of pure element B is higher than the melting point of pure element A. As the two elements are combined, the melting point of the mixture or solution decreases from both sides (100% A and 100% B) of the graph. At the 505/50 weight percent combination (conveniently represented as the eutectic in this classic graph, but not all eutectics are 50/50, and may range along the range of 99/1 through 1/99 weight percentages), it can be seen that the melting point of the solution is at the lowest temperature point of all combinations of the elements A and B. That is the eutectic point (e). The range of materials included within the term "eutectic mixture" or "approximate eutectic mixture" within the scope of practice of the present invention would allow for compositions that deviate from the precise eutectic point (here 50/50) would be, for example at ±10%, 45-55% A and 55-45% B (by weight) and at ±15%, 42.5-57.5%% A and 57.5-42.5% B. If the eutectic point were at a less idealized point on 30% A and 70% B, the range included within eutectic mixture or approximate eutectic mixture according the definition in the present invention would be, for example at ±10%, 33-27% A and 67-73% B, or where measured from the B side of the graph, 77-63% B and 23-37% A. The ingredients A and B must still form a eutectic to fall within the definition of eutectic mixture.

Compositions of eutectic systems that are not the eutectic composition are commonly defined to be hypoeutectic or hypereutectic. Hypoeutectic composition are composition to the left of the eutectic composition and hypereutectic composition are compositions to the right.

Eutectic alloys are still eutectic mixtures or eutectic systems within the scope of the present technology and have two or more materials and have a eutectic composition. When a non-eutectic alloy solidifies, its components solidify at different temperatures, exhibiting a plastic melting range. A eutectic alloy solidifies at a single, sharp temperature. The phase transformations that occur while solidifying a given alloy can be understood by drawing a vertical line from the liquid phase to the solid phase on a phase diagram.

Many eutectic mixtures contain lead, such as lead/tin, lead/silver, lead/bismuth and the like. Eutectic mixtures can also include third elements such as lead/tin/silver, and these may produce double eutectic points, but would be within the practice of the present technology.

Another perspective on the properties of eutectics that identifies them is their individual cooling curves, which can be visualized in FIG. 2. At an arbitrary point X in the two-phase region on the phase diagram in FIG. 1, the overall composition is given at point X. The system is composed of two phases, a pure solid A phase, and a liquid phase, whose composition is given at a corresponding point Z. The line YXZ is a tie line connecting the two phases, and the lever rule applies. This is represented in FIG. 3, showing a phase diagram with points displayed for interpreting FIG. 2.

A second break in the cooling curve appears at $T_E$, the eutectic temperature. The horizontal portion of the cooling curve corresponds to the solidification of the eutectic mixture. It has the same appearance as the curve for the solidification of the pure compound. In fact, eutectic mixtures give the appearance of pure compounds. They have constant freezing points, and the solid eutectic mass is a very fine grained mixture of the two components. The horizontal portion corresponding to the freezing of the eutectic is known as the eutectic halt. When the last of the eutectic has solidified, the cooling curve again begins its downward trend.

At the eutectic point, there are three distinct phases in equilibrium: liquid solution, pure solid A, and pure solid B. At constant pressure, the eutectic point is fixed and has no degrees of freedom remaining.

Cooling curve (iii) is for a mixture somewhat richer in component B and resembles (ii). The first break occurs at a somewhat lower temperature, and the eutectic halt is longer, since there is more eutectic present when $T_E$ is reached. The cooling curve for the eutectic composition is shown by curve (iv). Now there is only one break, that break occurring at $T_E$. To complete the series of cooling curves, the curves (v) and (vi) have also been shown. Curve (v) is for an isopleth (a curve of constant composition) to the right of the eutectic and is completely analogous to curves (ii) and (iii). Curve (vi) is for pure component B and is similar to curve (i); the horizontal portion occurs at $T_B$, the melting point of pure B. With enough cooling curves, a complete phase diagram like that in FIG. 2 can be constructed by plotting the points corresponding to the breaks in the cooling curves and connecting these points by smooth curves.

The liquid-vapor phase diagrams are of interest mainly to chemists and chemical engineers. The properties of phase diagrams of condensed systems are of interest to a wider variety of fields such as metallurgy, ceramic, and geology.

If a two substances are miscible in the liquid state and insoluble in the solid state, the region where a solid and liquid are in equilibrium can be considered a solubility problem. As the mole fraction of the substance approaches 1, it precipitates out. To see an example of this behavior, the temperature variation of this solubility can be given in the form of an equation $$\ln X = \frac{\Delta H_{fus}}{R}\left(\frac{1}{T^0} - \frac{1}{T}\right) \tag{1}$$

where X is the mole fraction of substance, $\Delta H_{fus}$ is its heat of fusion, $T^0$, is its melting point, and T is the temperature. This equation is only valid for ideal solutions.

Salient is the demonstration that catalyst particles can be formed and processed in-situ during the reaction. Further, it was demonstrated that when the support is in the liquid state that solid products (e.g., carbon nanotubes) can be removed from the catalyst/support system cleanly and constantly during catalyst operation.

The eutectic preferably may be selected from mixtures of metal wherein one metal of the eutectic is lead and the metal of the metal catalyst is selected from the group consisting of at least one of lead, tin, bismuth, silver, gallium, mercury, aluminum and the like, as well as alloys thereof.

What is claimed:
1. A supported catalyst system comprising:
   a metal composition obtained by a process comprising the steps of:
   a) forming a metal eutectic composition comprising at least two metals; and b) suspending metal catalyst particles having average diameters of from 1-25 nm throughout the metal eutectic composition;
wherein a metal in the metal catalyst particles is a different metal than the at least two metals in the metal eutectic composition;
wherein the metal eutectic composition is in a liquid state and the metal catalyst particles reaches an equilibrium state in the metal eutectic composition;
wherein the metal eutectic composition is at a temperature of between a melting point of the metal eutectic composition and 750° C., and, wherein metal in the metal catalyst particles forms an equilibrium state with the metal eutectic composition such that the metal of the metal catalyst particles dissolves into the metal eutectic composition and precipitates from the metal eutectic composition to form new metal catalyst particles such that residues or precipitates on surfaces of the metal catalyst particles are separated from the newly formed metal catalyst particles.

2. The supported catalyst system of claim 1, wherein the metal eutectic composition in the liquid state is at a temperature of between 20° C. and 750° C.

3. The supported catalyst system of claim 1, wherein gaseous alcohol bubbles and hydrogen gas bubbles are present within the metal eutectic composition.

4. The supported catalyst system of claim 1, wherein one metal of the at least two metals in the metal eutectic composition comprises lead.

5. A method comprising:
catalytically chemically modifying organic compound in a catalytic reaction comprising:
forming the metal composition of claim 1;
flowing a gaseous organic compound as bubbles through the metal composition;
the gas bubbles contacting the metal catalyst particles of claim 1, the metal catalyst particles being exposed from the metal composition against an interface between the bubbles and the metal composition; and
altering a chemical composition of the organic compound by a catalyzed reaction that occurs on contact with the metal catalyst particles.

6. The method of claim 5, wherein a reaction product of the catalyzed reaction of the organic compound is hydrogen.

7. The method of claim 5, wherein a reaction product of the catalyzed reaction of the organic compound comprises carbon.

8. The method of claim 5, wherein the metal composition is maintained within a temperature range of 20° C. and 650° C. and the organic compound consists of carbon, hydrogen and oxygen.

9. The method of claim 5, wherein the metal composition is maintained within a temperature range of 100° C. and 650° C., gaseous organic compound flows as bubbles through the metal composition, and the gas bubbles contact metal catalyst particles exposed from the metal composition against an interface between the bubbles and the metal composition.

10. The method of claim 9, wherein an alteration of the gaseous organic compound generates hydrogen.

11. The method of claim 9, wherein the organic compound comprises an alcohol.

12. The method of claim 5, wherein the metal composition is maintained in a liquid state at a temperature of between 120° C. and 650° C. and an equilibrium state of the metal catalyst particles is maintained wherein a metal portion of a metal catalyst dissolves off the metal catalyst particles and precipitates onto the metal catalyst particles.

13. The method of claim 12, wherein the dissolving and precipitation maintains a clean surface comprising metal of the metal catalyst on surfaces of the metal catalyst particles.

14. The method of claim 5, wherein the metal eutectic composition comprises a mixture of metals, wherein one metal of the metal eutectic composition is lead.

15. The method of claim 14, wherein a second metal of the metal eutectic composition is selected from the group consisting of bismuth, tin, silver, gallium, and aluminum.

16. The method of claim 14 wherein the metal catalyst particles comprises at least one metal selected from the group consisting of Fe, Ni, Co and Au.

* * * * *